US008333836B2

(12) United States Patent
Luo et al.

(10) Patent No.: US 8,333,836 B2
(45) Date of Patent: Dec. 18, 2012

(54) FIBER CEMENT COMPOSITE MATERIALS USING BLEACHED CELLULOSE FIBERS

(75) Inventors: Caidian Luo, Alta Loma, CA (US); Donald J. Merkley, Alta Loma, CA (US)

(73) Assignee: James Hardie Technology Limited, Dublin (IE)

( * ) Notice: Subject to any disclaimer, the term of this patent is extended or adjusted under 35 U.S.C. 154(b) by 0 days.

(21) Appl. No.: 13/066,163

(22) Filed: Apr. 7, 2011

(65) Prior Publication Data

US 2011/0248421 A1  Oct. 13, 2011

Related U.S. Application Data

(62) Division of application No. 10/753,089, filed on Jan. 7, 2004, now Pat. No. 7,942,964.

(60) Provisional application No. 60/439,040, filed on Jan. 9, 2003.

(51) Int. Cl.
  *C04B 16/06* (2006.01)
(52) U.S. Cl. ........ 106/713; 106/644; 106/711; 106/724; 106/726; 106/731; 428/296
(58) Field of Classification Search ............... 106/713, 106/644, 711, 724, 726, 731; 428/296
  See application file for complete search history.

(56) References Cited

U.S. PATENT DOCUMENTS

| | | |
|---|---|---|
| 1,571,048 A | 1/1926 | Garrow |
| 1,914,163 A | 6/1933 | Randall |
| 2,024,689 A | 12/1935 | Groombridge et al. |
| 2,030,383 A | 2/1936 | Luth et al. |
| 2,054,854 A | 9/1936 | Dreyfus |
| 2,156,308 A | 5/1939 | Schuh |
| 2,156,311 A | 5/1939 | Schuh |
| 2,175,568 A | 10/1939 | Haustein |
| 2,175,569 A | 10/1939 | Kennedy |
| 2,176,668 A | 10/1939 | Egeberg et al. |
| 2,377,484 A | 6/1945 | Elmendorf |
| 2,645,576 A | 7/1953 | Bate et al. |
| 2,880,101 A | 3/1959 | Ulfstedt |
| 3,264,125 A | 8/1966 | Bourlin |
| 3,716,386 A | 2/1973 | Kempster |

(Continued)

FOREIGN PATENT DOCUMENTS

AR  250022  7/1996

(Continued)

OTHER PUBLICATIONS

"Slow crack growth in bleached cellulose fiber cements", Mai et al., Journal of Mat'ls Science Letters 3 (1984), 127-130.*

(Continued)

*Primary Examiner* — Paul Marcantoni
(74) *Attorney, Agent, or Firm* — Gardere Wynne Sewell LLP

(57) ABSTRACT

A fiber cement composite material that incorporates a blend of bleached and unbleached cellulose fibers as a partial or complete substitute for premium grade cellulose pulp is provided. Bleached standard grade cellulose fibers are used in conjunction with unbleached, standard grade cellulose fibers to provide a fiber cement composite product having substantially equal or even superior flexibility and strength as an equivalent fiber cement composite material reinforced by premium grade, unbleached cellulose fibers. A synergistic combination of bleached and unbleached standard grade cellulose fibers to produce a composite material with the desired properties previously achievable only through the use of premium grade cellulose pulp.

20 Claims, 2 Drawing Sheets

U.S. PATENT DOCUMENTS

| | | | |
|---|---|---|---|
| 3,748,100 | A | 7/1973 | Forseth |
| 3,748,160 | A | 7/1973 | Carbajal |
| 3,753,749 | A | 8/1973 | Nutt |
| 3,836,412 | A | 9/1974 | Boustany et al. |
| 3,843,380 | A | 10/1974 | Beyn |
| 3,865,779 | A | 2/1975 | Oya et al. |
| 3,918,981 | A | 11/1975 | Long |
| 3,931,069 | A | 1/1976 | Lundin |
| 3,969,567 | A | 7/1976 | Occleshaw et al. |
| 3,998,944 | A | 12/1976 | Long |
| 4,003,752 | A | 1/1977 | Isohata et al. |
| 4,013,480 | A | 3/1977 | Chumbley et al. |
| 4,088,804 | A | 5/1978 | Cornwell et al. |
| 4,098,701 | A | 7/1978 | Burrill et al. |
| 4,102,697 | A | 7/1978 | Fukuba et al. |
| 4,138,313 | A | 2/1979 | Hillstrom et al. |
| 4,177,176 | A | 12/1979 | Burrill et al. |
| 4,225,383 | A | 9/1980 | McReynolds |
| 4,258,090 | A | 3/1981 | Moraru |
| 4,274,913 | A | 6/1981 | Kikuiri et al. |
| 4,306,911 | A | 12/1981 | Gordon et al. |
| 4,351,867 | A | 9/1982 | Mulvey et al. |
| 4,406,703 | A | 9/1983 | Guthrie et al. |
| 4,428,775 | A | 1/1984 | Johnson et al. |
| 4,457,785 | A | 7/1984 | Hsu et al. |
| 4,486,234 | A | 12/1984 | Herr |
| 4,497,688 | A | 2/1985 | Schaefer |
| 4,510,020 | A | 4/1985 | Green et al. |
| 4,517,375 | A | 5/1985 | Schmidt et al. |
| 4,548,676 | A | 10/1985 | Johnstone et al. |
| 4,637,860 | A | 1/1987 | Harper et al. |
| 4,643,920 | A | 2/1987 | McEntee et al. |
| 4,647,505 | A | 3/1987 | Blackie et al. |
| 4,647,509 | A | 3/1987 | Wallace et al. |
| 4,647,589 | A | 3/1987 | Valone |
| 4,655,979 | A | 4/1987 | Nakano et al. |
| 4,659,386 | A | 4/1987 | Nagai et al. |
| 4,738,723 | A | 4/1988 | Frizzell et al. |
| 4,766,113 | A | 8/1988 | West et al. |
| 4,806,203 | A | 2/1989 | Elton |
| 4,938,958 | A | 7/1990 | Niira et al. |
| 4,944,842 | A | 7/1990 | Stromberg et al. |
| 4,971,658 | A | 11/1990 | Henrickson et al. |
| 4,985,119 | A | 1/1991 | Vinson et al. |
| 5,021,093 | A | 6/1991 | Beshay |
| 5,030,289 | A | 7/1991 | Sattler et al. |
| 5,047,086 | A | 9/1991 | Hayakawa et al. |
| 5,049,196 | A | 9/1991 | Ries |
| 5,063,260 | A | 11/1991 | Chen et al. |
| 5,102,596 | A | 4/1992 | Lempfer et al. |
| 5,118,225 | A | 6/1992 | Koch et al. |
| 5,191,456 | A | 3/1993 | Sutherland et al. |
| 5,223,090 | A | 6/1993 | Klungness et al. |
| 5,236,994 | A | 8/1993 | Markusch et al. |
| 5,346,541 | A | 9/1994 | Goldman et al. |
| 5,403,392 | A | 4/1995 | Craig |
| 5,405,498 | A | 4/1995 | Pease |
| 5,415,734 | A | 5/1995 | Backlund et al. |
| 5,421,867 | A | 6/1995 | Yeager et al. |
| 5,429,717 | A | 7/1995 | Bokstrom et al. |
| 5,432,215 | A | 7/1995 | Girg et al. |
| 5,465,547 | A | 11/1995 | Jakel |
| 5,472,486 | A | 12/1995 | Dragner et al. |
| 5,482,550 | A | 1/1996 | Strait |
| 5,520,779 | A | 5/1996 | Bold |
| 5,577,024 | A | 11/1996 | Malkamaki et al. |
| RE35,460 | E | 2/1997 | Klungness et al. |
| 5,643,359 | A | 7/1997 | Soroushian et al. |
| 5,705,542 | A | 1/1998 | Roffael et al. |
| 5,777,024 | A | 7/1998 | Killilea et al. |
| 5,786,282 | A | 7/1998 | Carter et al. |
| 5,795,515 | A | 8/1998 | Fischer |
| 5,804,003 | A | 9/1998 | Nishizawa |
| 5,866,057 | A | 2/1999 | Roffael et al. |
| 5,871,824 | A | 2/1999 | Bates |
| 5,876,561 | A | 3/1999 | Tsai |
| 5,897,701 | A | 4/1999 | Soroushian et al. |
| 5,945,044 | A | 8/1999 | Kawai et al. |
| 5,989,335 | A | 11/1999 | Soroushian et al. |
| 6,030,447 | A | 2/2000 | Naji et al. |
| 6,045,057 | A | 4/2000 | Moor et al. |
| 6,086,998 | A | 7/2000 | Wihsmann et al. |
| 6,138,430 | A | 10/2000 | Van Acoleyen et al. |
| 6,176,920 | B1 | 1/2001 | Murphy et al. |
| 6,228,215 | B1 | 5/2001 | Hoffman, Jr. |
| 6,245,196 | B1 | 6/2001 | Martin et al. |
| 6,325,853 | B1 | 12/2001 | Hogan et al. |
| 6,344,654 | B1 | 2/2002 | Lesko |
| 6,346,146 | B1 * | 2/2002 | Duselis et al. ................ 106/713 |
| 6,346,165 | B1 | 2/2002 | Markessini et al. |
| 6,352,952 | B1 | 3/2002 | Jardine et al. |
| 6,353,952 | B1 | 3/2002 | Wells |
| 6,419,788 | B1 | 7/2002 | Wingerson |
| 6,475,275 | B1 | 11/2002 | Nebesnak et al. |
| 6,488,762 | B1 | 12/2002 | Shi |
| 6,506,248 | B1 * | 1/2003 | Duselis et al. ................ 106/713 |
| 6,512,132 | B2 | 1/2003 | Isoda et al. |
| 6,528,151 | B1 | 3/2003 | Shah et al. |
| 6,562,743 | B1 | 5/2003 | Cook et al. |
| 6,572,697 | B2 | 6/2003 | Gleeson et al. |
| 6,613,424 | B1 | 9/2003 | Putt et al. |
| 6,676,744 | B2 | 1/2004 | Merkley et al. |
| 6,676,745 | B2 | 1/2004 | Merkley et al. |
| 6,719,878 | B1 | 4/2004 | Svedman |
| 6,749,897 | B2 | 6/2004 | Naji et al. |
| 6,770,576 | B2 | 8/2004 | Cook et al. |
| 6,777,103 | B2 | 8/2004 | Merkley et al. |
| 6,837,452 | B2 * | 1/2005 | Dezutter et al. ................ 241/16 |
| 6,872,246 | B2 | 3/2005 | Merkley et al. |
| 6,893,751 | B2 | 5/2005 | Naji et al. |
| 6,933,038 | B2 | 8/2005 | Nanko et al. |
| 6,942,726 | B2 * | 9/2005 | Cook et al. .................... 106/644 |
| 7,028,436 | B2 | 4/2006 | Bezubic, Jr. |
| 7,081,184 | B2 | 7/2006 | Wester et al. |
| 7,226,525 | B2 | 6/2007 | Vrbanac et al. |
| 7,300,546 | B2 | 11/2007 | Jewell et al. |
| 7,344,593 | B2 | 3/2008 | Luo et al. |
| 7,455,727 | B2 | 11/2008 | Trevethick |
| 2002/0007926 | A1 | 1/2002 | Jewell et al. |
| 2002/0007927 | A1 | 1/2002 | Vahatalo et al. |
| 2002/0051892 | A1 | 5/2002 | Laks et al. |
| 2002/0059886 | A1 | 5/2002 | Merkley et al. |
| 2002/0069791 | A1 | 6/2002 | Merkley et al. |
| 2002/0088584 | A1 | 7/2002 | Merkley et al. |
| 2002/0112827 | A1 | 8/2002 | Merkley et al. |
| 2002/0121229 | A1 | 9/2002 | Jardine et al. |
| 2002/0170466 | A1 | 11/2002 | Naji et al. |
| 2002/0170467 | A1 | 11/2002 | Naji et al. |
| 2002/0170468 | A1 | 11/2002 | Luo et al. |
| 2002/0175126 | A1 | 11/2002 | Naji et al. |
| 2002/0179219 | A1 | 12/2002 | Naji et al. |
| 2002/0189499 | A1 | 12/2002 | Naji et al. |
| 2002/0189500 | A1 | 12/2002 | Naji et al. |
| 2002/0192510 | A1 | 12/2002 | Naji et al. |
| 2003/0000424 | A1 | 1/2003 | Naji et al. |
| 2003/0164119 | A1 | 9/2003 | Naji et al. |
| 2003/0213568 | A1 | 11/2003 | Wester et al. |
| 2003/0213569 | A1 | 11/2003 | Wester et al. |
| 2003/0213570 | A1 | 11/2003 | Vrbanac et al. |
| 2003/0213572 | A1 | 11/2003 | Vrbanac et al. |
| 2004/0043217 | A1 * | 3/2004 | Dezutter et al. ............... 428/407 |
| 2004/0043686 | A1 | 3/2004 | Batdorf |
| 2004/0132843 | A1 | 7/2004 | Baumgart et al. |
| 2004/0145078 | A1 | 7/2004 | Merkley et al. |
| 2004/0168615 | A1 | 9/2004 | Luo et al. |
| 2005/0016423 | A1 | 1/2005 | Merkley et al. |
| 2005/0045067 | A1 | 3/2005 | Naji et al. |
| 2005/0126430 | A1 | 6/2005 | Lightner, Jr. et al. |
| 2005/0208287 | A1 | 9/2005 | Naji et al. |
| 2005/0235883 | A1 | 10/2005 | Merkley et al. |
| 2007/0077436 | A1 | 4/2007 | Naji et al. |

FOREIGN PATENT DOCUMENTS

| | | |
|---|---|---|
| AR | 015457 A1 | 9/1998 |
| AR | 014046 A1 | 11/1998 |
| AR | 014702 A1 | 3/1999 |
| AT | 391131 B | 8/1990 |

| | | |
|---|---|---|
| AU | 515151 | 3/1981 |
| AU | 2002240552 | 9/2002 |
| CA | 1177205 | 11/1984 |
| CA | 2242749 | 2/1999 |
| CA | 2405354 | 11/2001 |
| CL | 32972 | 2/1980 |
| CL | 2347-01 | 9/2001 |
| CL | 2352-01 | 9/2001 |
| CL | 2353-01 | 9/2001 |
| CL | 461-02 | 3/2002 |
| CL | 2346-01 | 8/2002 |
| CN | 1032332 A | 4/1989 |
| CN | 1199116 | 11/1998 |
| CN | 1224701 A | 8/1999 |
| DE | 3308917 A1 | 9/1984 |
| DE | 3601736 A1 | 7/1987 |
| DE | 4316666 C1 | 12/1994 |
| DE | 19654836 A1 | 6/1998 |
| EP | 0049365 | 4/1982 |
| EP | 0056263 A1 | 7/1982 |
| EP | 0147429 A1 | 7/1985 |
| EP | 263723 * | 4/1988 |
| EP | 0263723 B1 | 4/1988 |
| EP | 0287962 A1 | 10/1988 |
| EP | 0305209 A1 | 3/1989 |
| EP | 0331666 A1 | 9/1989 |
| EP | 0484283 | 5/1992 |
| EP | 0716182 | 6/1996 |
| EP | 1052262 A2 | 11/2000 |
| EP | 1088800 A2 | 4/2001 |
| EP | 1106236 A1 | 6/2001 |
| EP | 1155794 A2 | 11/2001 |
| EP | 1346964 A2 | 9/2003 |
| EP | 1334076 B1 | 8/2006 |
| FR | 895.184 | 1/1945 |
| FR | 1557348 | 2/1969 |
| FR | 2611432 | 9/1988 |
| GB | 22139 | 0/1901 |
| GB | 442098 | 2/1936 |
| GB | 449384 | 6/1936 |
| GB | 731597 | 6/1955 |
| GB | 1003850 | 9/1965 |
| GB | 1536663 | 12/1978 |
| GB | 2041384 | 9/1980 |
| GB | 1604910 | 12/1981 |
| GB | 2137977 | 10/1984 |
| GB | 2307425 | 5/1997 |
| JP | 55085756 | 6/1980 |
| JP | 59-203747 | 11/1984 |
| JP | 60-118658 | 6/1985 |
| JP | 61019900 | 1/1986 |
| JP | 63-107849 | 5/1988 |
| JP | 01141849 | 6/1989 |
| JP | 03016978 | 1/1991 |
| JP | 04182335 | 6/1992 |
| JP | 04342746 | 11/1992 |
| JP | 05177625 | 7/1993 |
| JP | 05184246 | 7/1993 |
| JP | 06024821 | 2/1994 |
| JP | 06144911 | 5/1994 |
| JP | 06-341093 | 12/1994 |
| JP | 07041592 | 2/1995 |
| JP | 07109165 | 4/1995 |
| JP | 08119708 | 5/1996 |
| JP | 08-260371 | 10/1996 |
| JP | 09-255385 | 9/1997 |
| JP | 10095922 | 4/1998 |
| JP | 11010631 | 1/1999 |
| JP | 11099512 | 4/1999 |
| JP | 2000-044302 | 2/2000 |
| JP | 2001240458 | 9/2001 |
| JP | 2001316163 | 11/2001 |
| JP | 2003335560 | 11/2003 |
| KR | 1019950008587 B1 | 8/1995 |
| PL | 154782 | 12/1991 |
| SU | 240472 | 3/1969 |
| WO | WO 84/04765 | 12/1984 |
| WO | WO 91/01409 | 2/1991 |
| WO | WO 95/20066 | 7/1995 |
| WO | WO 96/17996 | 6/1996 |
| WO | WO 97/08111 | 3/1997 |
| WO | WO 97/31153 | 8/1997 |
| WO | WO 98/18855 | 5/1998 |
| WO | WO 98/27027 | 6/1998 |
| WO | WO 98/45222 | 10/1998 |
| WO | WO 99/35330 | 7/1999 |
| WO | WO 00/71336 | 11/2000 |
| WO | WO 01/30927 | 5/2001 |
| WO | WO 01/68547 | 9/2001 |
| WO | WO 01/81666 | 11/2001 |
| WO | WO 02/12623 | 2/2002 |
| WO | WO 02/18486 | 3/2002 |
| WO | WO 02/28795 | 4/2002 |
| WO | WO 02/28796 | 4/2002 |
| WO | WO 02/33164 | 4/2002 |
| WO | WO 02/070425 | 9/2002 |
| WO | WO 02/072499 | 9/2002 |
| WO | WO 2004/063113 | 7/2004 |

OTHER PUBLICATIONS

"Effects of water and bleaching on the mechanical properties of cellulose fiber cements", Mai et al., Journal of Materials Science 18 (1983) p. 2156-62.*

Matsushita Electric Works Ltd., unofficial translation for JP 60-118658 published Jun. 26, 1985.

Nichiha Corporation, unofficial translation for JP 2000-044302 published Feb. 15, 2000.

U.S. Appl. No. 10/070,218 entitled Extrudable Cementitious Material filed Jul. 19, 2002; first-named inventor: Peter Goodwin.

Adams, Bill, Affidavit and accompanying documents, Weyerhauser, Nov. 11, 2006.

Aldajani, Waleed W., et al., "Pre-extraction of hemicelluloses and subsequent kraft pulping Park I: alkaline extraction," TAPPI Journal, Jun. 2008, pp. 3-8.

Australian Patent Office, International Search Authority, International Search Report for PCT/AU03/01315, mailed Nov. 12, 2003, Australia.

Babachev, G.N., et al., "Plasticizing effect of aliphatic amines on cement," Chemical Abstracts on STN, (1972), 430-5, 24(11), Build Scit. Inst., Sofia, Bulgaria.

Berry, Craig, "Determination of the influence of Pulp Chemical Oxygen Demand on the Flexural Strength of Cured Fibercement," submitted in opposition proceeding of EP 1330571 on Aug. 1, 2008, pp. 1-11.

Blankenhorn, P.R., et al., "Temperature and moisture effects on selected properties of wood fiber-cement composites," Cement and Concrete Research, (1999), pp. 737-741, Elsevier Science Ltd.

Bledzki, A.K., et al., "Composites reinforced with cellulose based fibres," Progress in Polymer Science, (1999), pp. 221-274, Elsevier Science Ltd.

Campbell, M.D., et al. "Wood fibre-reinforced cement composites," Journal of Materials Science, (1980), pp. 1962-1970, vol. 15, Chapman and Hall Ltd.

Chemical Abstracts No. 51915a, XP 000186251, "Building materials with improved black mold resistance," Feb. 23, 1981, vol. 94, No. 8, Columbus, Ohio.

Chemical Abstracts No. 114971, XP 000183799, "Lightweight cement moldings," Apr. 7, 1986, vol. 104, No. 14, Columbus, Ohio.

Claeys, P., "Statement of Facts and Grounds," filed with European Patent Office in opposition proceeding of EP 1330571, Dec. 15, 2006, 22 pgs. (with translation).

Claeys, P., Letter to European Patent Office filed in opposition proceeding of EP 1330571, (Aug. 1, 2008), 14 pgs. (with translation).

Coutts, R.S.P., "From Forest to Factory to Fabrication," Fibre Reinforced Cement and Concrete, (1992), pp. 31-47, ed. R.N. Swamy, E & FN SPON, London.

Dahl, Professor Olli, Expert Declaration and CV provided in matter of EP 1330571, Jan. 28, 2009, 7 pgs.

Derwent No. XP-002335289, Abstract of JP61019900, Applicant: Ig Gijutsu Kenkyusho KK, published Jan. 28, 1986, Derwent Publications Ltd., London, GB.

Derwent No. XP002197953, Abstract of JP2001240458, Applicant: Kamishima Kagaku Kogyo KK, published Sep. 4, 2001, Derwent Publications Ltd., London, GB.

Documents submitted by REDCO in opposition proceeding of EP 1330571 on Aug. 1, 2008.

Energy Seal, "Elastomeric wall coatings—Everlast™," located at http://www.energy-seal.com/es-home.nsf/products/everlast , Aug. 14, 2004, 2 pgs.

Ekman, et al., "Studies on the behavior of extractives in mechanical pulp suspensions," Nordic Pulp and Paper Research Journal, (1990), pp. 96-103, vol. 2, Abo, Finland.

European Patent Office, Communication pursuant to Article 115(2) EPC, Observations by a third in EP Application No. 04700639.0 filed Aug. 23, 2006, 3 pgs.

European Patent Office, Communication pursuant to Rule 114(2) EPC and Article 115 EPC, Observations by a third party in EP Application No. 01975765.7 filed Jul. 2, 2010, 13 pgs.

European Patent Office, Communication pursuant to Rule 114(2) EPC and Article 115 EPC, Observations by a third party in EP Application No. 01973377.3 filed Jun. 25, 2010, 3 pgs.

European Patent Office, Communication under Rule 71(3) EPC for EP 01973377.3 dated Jul. 7, 2010 (1 pg.) and Communication pursuant to Article 94(3) EPC for EP 01973377.3 dated Jul. 12, 2010 (4 pgs.).

European Patent Office, International Search Authority, International Search Report for PCT/US01/42243, mailed May 15, 2002, Rijswijk, The Netherlands.

European Patent Office, International Preliminary Examining Authority, Written Opinion for PCT/US01/42243, mailed May 28, 2002, Munich, Germany.

European Patent Office, International Search Authority, International Search Report for PCT/US2005/007581, mailed Aug. 3, 2005, Rijswijk, The Netherlands.

European Patent Office, Communication pursuant to Rule 114(2) EPC, Observations by a third party in EP 1330420, dated Mar. 24, 2011, Munich, Germany.

Finnish Forest Industries Federation, "Mechanical pulp production," located at http://english.forestindustries.fi/products/pulp/mechanical.html , Nov. 10, 2004, 2 pgs.

Force 10 Engineered Building Systems, "Force 10 Caribbean Custom Features" article located at http://www.force-10.com/about/customfeatures.htm, (1999), 5 pgs., Innovative Builders.

Harper, S., et al., "Resin extraction and effects on pulp quality," Proceedings of the 54$^{th}$ Appita Annual Conference, Apr. 3-6, 2000, pp. 575-580, Melbourne, Australia.

Information Disclosure Statements filed with the U.S. Patent and Trademark Office for U.S. Appl. No. 10/753,089 on Sep. 28, 2007 and Oct. 29, 2007, 5 pgs.

JUB, "Special Anti-Mildew Coatings," (Technical Sheet 10), brochure dated Sep. 2002, pp. 1-4, JUB Kemicna Industrija, Slovenija.

Locher, Friedrich W., "Fundaments of Production and Application," (with translation), 2000, p. 412, VBT.

Lewis Sr., Richard, definition of "dispersing agent," Hawley's Condensed Chemical Dictionary, Twelfth Edition, (1993), p. 435, Van Nostrand Reinhold.

Lin, et al., "Improvements in the durability of cellulose reinforced cementitious composites," Mechanisms of Chemical Degradation of Cement-Based Systems, Proceedings of the Materials Research Society's Symposium of Mechanisms of Chemical Degradation of Cement-Based Systems, Nov. 27-30, 1995, E & FN Spon., London, UK.

Louisiana-Pacific Samao, Inc., Technical File sent to Redco on May 5, 1999.

Mai, Y.W., et al., "Effects of water and bleaching on the mechanical properties of cellulose fibre cements," Journal of Materials Science, (1983), pp. 2156-2162, vol. 18, Chapman and Hall Ltd., London.

Mai, Y. W., et al., "Slow crack growth in bleached cellulose fibre cements," Journal of Materials Science Letters, (1984), pp. 127-130, vol. 3, Chapman and Hall Ltd., London.

Merriam-Webster, definition of "pulp," Webster's Third New International Dictionary of the English Language unabridged, (1986), p. 1840, Merriam-Webster Inc., Springfield, Massachusetts.

Nefsi, "Hardi-Plank and Surface Mold" message board posts, http://www.nefsi.org/wwwboard/messages/439.html, Jun. 13, 2003, 2 pgs., The National Organization of Exterior Finish System Inspectors, Portland, Oregon.

Neithalath, Narayanan, et al "Acoustic performance and damping behavior of cellulose-cement composites," Cement & Concrete Composites (2003), pp. 1-12, vol. 25, Elsevier Science Ltd.

Ribeaudeau, Marion, et al., "Statement of Facts and Grounds," filed with European Patent Office in opposition proceeding of EP 1330571, (Jan. 19, 2007), 28 pgs. (with translation).

Ribeaudeau, Marion, et al., Letter to European Patent Office filed in opposition proceeding of EP 1330571, (Aug. 1, 2008), 3 pgs. (with translation).

Roffael, Proffessor Dr.-Ing. Edmone, Expert Declaration and CV provided in matter of EP 1330571, Jan. 28, 2009, 20 pgs.

Roskill, Sir Ashton, et al., "Chapter 5: Asbestos Cement Products," Asbestos and Certain Asbestos Products: A Report on the Supply of Asbestos and Certain Asbestos Products, Jan. 23, 1973, pp. 25-40, Competition Commission, Southampton Row, London.

Rozman, H.D., et al., "Improvements of Fibreboard Properties through Fibre Activation with Silane," J. Polymeric Mater, (1996), pp. 247-257, vol. 32, Overseas Publishers Association, The Netherlands.

Response to the Final Office Action Mailed Aug. 30, 2007, for U.S. Appl. No. 10/753,089, filed Oct. 31, 2007.

SCAN-Test Method C 45:00, "COD and TOC removable by washing," Scandinavian Pulp, Paper and Board Testing Committee, (Revised 2000), pp. 1-5.

SCAN-Test Method CM 45:91, "Water-soluble organic matter," Scandinavian Pulp, Paper and Board Testing Committee, (1991), pp. 1-4.

Shapiro, A.D., et al., "Manufacture of board resistant to biological degradation," Bumazhnaya Promyshiennost 36, 12 (1961) XP-002335287.

Soroushian, Parviz, "Development of Specialty Cellulose Fibers and Cementitious Matrices for Cellulose Fiber Reinforced Cement Composites" (1989), 39 pgs.

Stromberg, C.B., "Washing for Low Bleach Chemical Consumption," Environmental Issues: A TAPPI Press Anthology of Published Papers (1990), pp. 230-238, TAPPI Press, Atlanta, Georgia.

Stromberg, C.B., "Washing of Dissolved Organic Solids From Pulp," Equipment & Processes-Screens & Washers, Oct. 1994, pp. 32-39, Paper Asia.

Submission in opposition proceeding of EP 1330571 entitled "Effect of the Extraction Temperature upon the COD value of a Cellulose Pulp," (with translation) submitted Aug. 1, 2008, 2 pgs.

TAPPI, "Forming handsheets for physical tests of pulp," (1995), pp. 5-7, TAPPI, T 205 sp-95.

TAPPI, "Moisture in pulp, paper and paperboard," (1994), pp. 1-3, TAPPI, T 412 om-94.

Telysheva, Galina, et al., "Modification of the Properties of Pulp Fibres for Their Application in the Production of Composite Materials," Cellulose Chemistry and Technology, (1999), pp. 423-435, vol. 33.

Thai MDF Board Co., Ltd., "Beger Synotex Acrylic TM 100% Emulsion Paint," located at: http://www.thaimdf.com/paint_roofpaint.htm, (2003), 2 pgs., Thailand.

United States Patent and Trademark Office, Office Action for U.S. Appl. No. 10/753,089, mailed Jan. 16, 2008, 10 pgs., Alexandria, Virginia.

The International Bureau of WIPO, International Preliminary Report on Patentability for PCT/US2005/007581, issued Jun. 19, 2007, 7 pgs., Geneva, Switzerland.

Woods, Amy Lamb, "Keeping a Lid on It: Asbestos-Cement Building Materials" located at www.cr.nps.gov/hps/tps/recentpast/asbestosarticle.htm ; Aug. 2000, pp. 1-12, National Park Service, U.S. Dept. of the Interior.

Zhou, Ming, "The Trial of Antisepsis and Mothproof on Rural Timber Structure Architectures," China Wood Industry, (1987), pp. 16-24, Issue 2.

* cited by examiner

FIBER CEMENT COMPOSITE MATERIALS USING BLEACHED CELLULOSE FIBERS

CROSS REFERENCE TO RELATED APPLICATIONS

This application is a divisional of U.S. patent application Ser. No. 10/753,089, filed Jan. 7, 2004, now U.S. Pat. No. 7,942,964, which claims the benefit of U.S. Provisional Application No. 60/439,040, filed Jan. 9, 2003, the entirety of all said applications are hereby incorporated by reference.

BACKGROUND OF THE INVENTION

1. Field of the Invention

This invention relates generally to a fiber-reinforced composite material, and more particularly to a fiber cement building material utilizing a blend of bleached and unbleached cellulose fibers as reinforcing fibers, including formulations, methods of manufacture, and final products.

2. Description of the Related Art

Fiber-reinforced composite materials have been used to form various building products such as building sheets, panels, planks and roofing material. The reinforcement fibers used in these building products typically include natural and synthetic fibers such as metal fibers, glass fibers, asbestos fibers, and cellulose fibers such as those described in Australian Patent No. 515151 and U.S. Pat. No. 6,030,447, which are hereby incorporated by reference in their entirety. Presently, cellulose fiber is one of the preferred fibers for most commercial building material applications because it is an effective, low cost, and recyclable natural product that is compatible with most conventional fiber cement manufacturing processes such as refining and autoclaving.

The performance characteristics of most cellulose fiber reinforced building materials are highly dependent on the quality and characteristic of the cellulose fibers used. In particular, the species and grade of cellulose fibers can have a significant impact on the flexibility and strength of the building material. For example, unbleached, premium grade cellulose fibers derived from Pinus Radiata are known to provide the resulting product with higher strength because these fibers typically have longer length and favorable strength-related properties. Conversely, unbleached, standard grade cellulose fibers derived from a variety of other commonly available wood species such as Douglas fir, hemlock, spruce, white fir, southern pine, and redwood are generally shorter and/or weaker, imparting lower strength and flexibility to the product.

However, there are several disadvantages associated with the use of premium grade cellulose fibers. First, the source of premium grade cellulose pulp has been largely limited to one particular species of wood. The cost of such fibers is also significantly higher than other grades of unbleached pulp. Moreover, limited availability of premium grade pulp can place severe constraints on fiber cement manufacturing operations and ultimately drive up the cost of the product. As such, product manufacturers typically incorporate both premium grade and standard grade unbleached pulps in fiber-cement composite materials in order to provide a final product with adequate strength and flexibility at minimum cost.

Even so, unbleached standard grade Kraft pulps typically used for fiber cement are considered specialty grades of cellulose pulp and are sold at a premium price over other types of cellulose pulp commonly used in paper, linerboard or other cellulose pulp based products.

Hence from the foregoing, it will be appreciated that there is a need for a readily available, less costly substitute for premium grade cellulose fibers for use in the manufacturing of fiber cement composite materials. To this end, there is a particular need for a cellulose fiber that will provide fiber cement composite materials with substantially equal if not improved strength, flexibility and other physical properties as compared to equivalent composite materials reinforced with premium grade cellulose fibers.

SUMMARY OF THE INVENTION

The aforementioned needs are satisfied by the preferred embodiments of the present invention, which in certain embodiments disclose the novel concept of using a blend of bleached and unbleached standard grade cellulose fibers as a partial or complete substitute for premium grade cellulose fibers in the manufacture of fiber cement reinforced composite materials.

The terms "bleached cellulose fibers," "bleached fibers" and "bleached cellulose pulp" used herein refer to cellulose fibers that have been treated with a bleaching agent such as hydrogen peroxide, sodium hypochlorite, chlorine, and/or chlorine dioxide. The bleached cellulose fibers may encompass pulp derived from a variety of species of wood including but not limited to Douglas fir, hemlock, P. Radiata pine, white fir, spruce, southern yellow pine, kenaf, and redwood. The bleached cellulose fibers can be prepared by Kraft, Sulfite, or other pulping methods.

The terms "premium grade cellulose fibers," "premium grade fibers" and "premium grade cellulose pulp" used herein refer to cellulose fibers derived from P. Radiata pines having an average fiber length of more than about 1.5 mm and an average tensile strength of more than about 12.5 km by TAPPI method T231. The terms "standard grade cellulose fibers," "standard grade fibers" and "standard grade cellulose pulp" used herein refer to cellulose fibers derived from .a variety of commonly available wood species such as Douglas fir, hemlock, spruce, white fir, southern pine, kenaf, and redwood, excluding P. Radiata pines. The term "standard grade cellulose fibers" can also be used to refer to "fiber cement grade cellulose fibers" known in the art.

In one aspect, the preferred embodiments of the present invention provide a composite material comprising a cementitious matrix and cellulose fibers incorporated into the cementitious matrix, wherein the cellulose fibers comprise a blend of bleached and unbleached cellulose fibers. In one embodiment, the bleached cellulose fibers comprise less than about 50%, preferably between about 5%-25%, of the total cellulose fibers incorporated into the matrix. In another embodiment, the bleached cellulose fibers have a Kappa number of less than or equal to about 10.

The bleached cellulose fibers are preferably standard grade fibers derived from species selected from the group consisting of Douglas fir, hemlock, spruce, southern pines, and redwood. In certain embodiments, the bleached cellulose fibers can also be premium grade fibers derived from P. Radiata pine. The unbleached cellulose fibers are preferably standard grade fibers comprising species selected from the group consisting of Douglas fir, hemlock, white fir, spruce, southern pine and redwood. In one embodiment, the bleached and unbleached cellulose fibers combined comprise about 0.5%-20% by weight of the composite material. In another embodiment, the bleached and unbleached cellulose fibers comprise standard grade cellulose fibers having an average fiber length of between about 1 mm to 3.5 mm. Preferably, the modulus of rupture (MOR) and toughness energy of the composite material reinforced with the blend of bleached and unbleached fibers are substantially equal to or greater than that of an equivalent material reinforced with unbleached, premium grade cellulose fibers.

In another aspect, the preferred embodiments of the present invention provide a method of manufacturing a fiber-reinforced cement composite material. The method comprises providing bleached and unbleached cellulose fibers; mixing the bleached and unbleached cellulose fibers with a cementitious binder to form a fiber cement mixture; forming the fiber cement mixture into a fiber cement article of a pre-selected shape and size; and curing the fiber cement article. In one embodiment, the step of providing the bleached cellulose fibers comprises treating standard grade cellulose fibers with a bleaching agent. Preferably, the bleached cellulose fibers have an average Kappa number of less than or equal to about 10. In another embodiment, providing the unbleached cellulose fibers comprises providing unbleached, standard grade cellulose fibers. Preferably, the bleached and unbleached cellulose fibers are mixed in pre-selected proportions to provide the composite material with pre-determined physical properties. In one embodiment, the pre-selected proportion is formulated to provide the composite material with a modulus of rupture (MOR) that is substantially equal to or greater than the MOR of an equivalent composite material reinforced with only premium grade cellulose fibers.

In yet another aspect, the preferred embodiments of the present invention provide a composite building material comprising a cementitious matrix and a blend of cellulose fibers. Preferably, the blend of cellulose fibers comprises bleached and unbleached cellulose fibers and is selected to provide the building material with pre-determined flexibility and strength. In one embodiment, the blend of cellulose fibers is selected to provide the building material with flexibility and tensile strength that are substantially equal or superior to that of an equivalent building material reinforced with only premium-grade cellulose fibers. In another embodiment, the blend of cellulose fibers is selected to provide the building material with flexibility and tensile strength that are substantially equal or superior to the flexibility and strength of an equivalent building material reinforced with only bleached cellulose fibers. Preferably, the blend of cellulose fibers comprises less than about 50%, more preferably between about 5%-25%, bleached cellulose fibers. Moreover, the blend of cellulose fibers preferably does not include premium grade cellulose fibers.

In yet another aspect, the preferred embodiments of the present invention provide a composite material comprising a cementitious matrix, a first portion of cellulose fibers having a Kappa number of less than or equal to about 10 and a second portion of standard grade cellulose fibers having a Kappa number of greater than about 10. In one embodiment, the first portion of cellulose fibers comprises premium grade cellulose fibers. In another embodiment, the first portion of the cellulose fibers comprises less than about 50% by weight of the total amount of the two portions of the cellulose fibers combined. Advantageously, the bleached, standard grade cellulose fibers combine synergistically with the unbleached, standard grade fibers in the cementitious matrix, resulting in a composite material with substantially equal or improved strength and flexibility when compared with equivalent composite materials formed with only premium grade cellulose fibers.

DETAILED DESCRIPTION OF THE EMBODIMENTS

Figure 1:
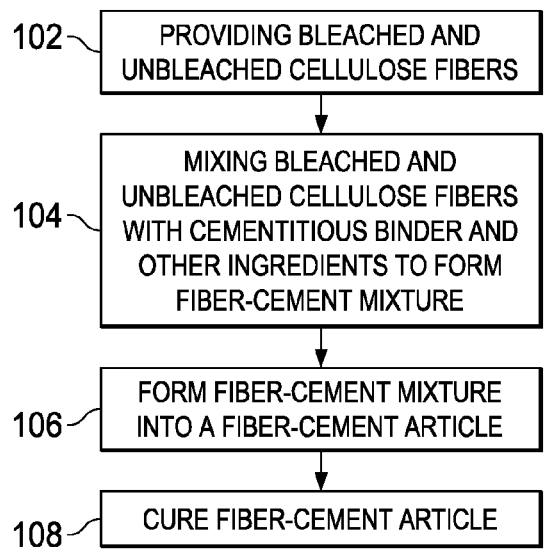
FIG. 1 illustrates the process flow of a preferred method of forming a fiber cement composite material reinforced with a blend of bleached and unbleached cellulose fibers.

Certain preferred embodiments of the present invention describe the use of a blend of bleached and unbleached cellulose fibers as reinforcement fibers in cementitious composite materials. In some preferred embodiments, the bleached and unbleached fibers are both standard grade fibers that in combination can serve as a partial or complete substitute for the more expensive and less abundant premium grade cellulose fibers. These embodiments encompass not only the composite materials formed with the blend of bleached and unbleached fibers, but also the formulation and methods of manufacture of the composite materials.

Bleached cellulose fibers have been used almost exclusively in the paper-making industry to provide white papers and paperboards. It is also widely recognized that the bleaching process degrades the fiber structure and weakens its reinforcing capabilities, making bleached fibers undesirable for fiber cement composite material applications. Such belief has been well documented in various technical publications. For example, in U.S. Pat. No. 4,985,119 entitled "Cellulose Fiber-Reinforced Structure", it indicates that "such bleaching [of the fibers] is not preferred due to cost and fiber degradation." Accordingly, it is against conventional wisdom to use bleached fibers as a reinforcing fiber for fiber cement composite materials because bleached fibers are generally believed to produce a fiber cement product that is weaker and more brittle.

However, contrary to conventional wisdom, Applicant has found that bleached cellulose fibers when used in proper proportions with unbleached, standard grade cellulose fibers can result in a fiber cement composite material with substantially equal or even superior flexibility, strength, and other physical properties when compared to an equivalent composite material reinforced by the more costly and less abundant premium grade cellulose fibers. It has been surprisingly found that proper blends of the selected bleached fibers and unbleached standard grade pulp give the final product a good balance of strength and flexibility.

Without wishing to be bound by a specific theory, Applicant believes that the bleached cellulose fibers have reduced lignin content and increased number of reactive sites on the fiber surface as compared with equivalent cellulose fibers not treated with a bleaching agent. Applicant believes that this allows improved bonding of the fibers with the cementitious matrix and helps overcome the shorter fiber length and fiber brittleness normally associated with standard grade cellulose pulps. When used in predetermined amounts that complement the properties of unbleached pulp, Applicant has surprisingly found that bleached cellulose pulps are indeed very effective reinforcement fibers for cement composites.

One embodiment of the present invention provides a fiber cement composite material that incorporates bleached cellulose fibers in combination with unbleached standard grade cellulose fibers as reinforcing fibers. In one embodiment, the individual fiber length is between about 1 mm to 3.5 mm.

Preferably, the bleached and unbleached fibers are used as a partial or complete substitute for the premium grade cellulose fibers that are commonly used in most fiber cement composite materials. The bleached cellulose fibers are preferably fibers treated with a bleaching agent such as hydrogen peroxide, sodium hypochlorite, or the like to reduce the lignin content of the fibers to a Kappa number of less than or equal to about 10. In one embodiment, the bleached fibers can comprise standard grade cellulose pulp of species including but not limited to Douglas fir, hemlock, white fir, spruce, kenaf, southern pines and redwood. Moreover, it will be appreciated that the preferred embodiments of the present invention are not limited to the use of bleached cellulose fibers as a substitute for premium grade fibers, but also include the use of all chemically treated fibers with substantially reduced lignin content and increased number of reaction sites on the fiber surface. Without wishing to be bound by theory, it is believed that the exposed reaction sites will increase the number of fiber-to-fiber and fiber-to-cement bonding in the matrix, which in turn imparts strength to the material comparable to that achieved by stronger fibers.

In one embodiment, the bleached cellulose fibers are incorporated in a fiber cement matrix in combination with unbleached, standard grade pulp. The bleached fibers preferably comprise less than about 50%, more preferably between about 5%-25%, of the total cellulose fibers incorporated into the matrix. The combination of bleached cellulose fibers and unbleached standard grade cellulose pulp can be used in a variety of composite materials all having different proportions of cementitious binder, aggregate, and cellulose fibers.

Most of the embodiments described herein can be encompassed by the following formulation:
- about 10%-80% cementitious binder (which, in certain embodiments, is selected from the group consisting of high alumina cement, lime, high phosphate cement, ground granulated blast furnace slag cement, and mixtures thereof);
- about 20%-80% aggregate (which, in certain embodiments, is selected from group consisting of ground silica, amorphous silica, micro silica, geothermal silica, diatomaceous earth, coal combustion fly ash, blast furnace slag, granulated slag, steel slag, mineral oxides, mineral hydroxides, clays, magnasite or dolomite, metal oxides and hydroxide, polymeric beads, and mixtures thereof);
- about 0.5%-20% cellulose fibers as comprising a combination of bleached standard grade cellulose fibers and unbleached standard grade cellulose fibers, and/or natural inorganic fibers, and/or synthetic fibers, wherein less than about 50% of the total cellulose fibers is bleached fibers;
- about 0%-80% density modifiers (which, in certain embodiments, is selected from the group consisting of plastic materials, expanded polystyrene or other foamed polymer materials, glass and ceramic materials, calcium silicate hydrates, microspheres and volcano ashes including perlite, pumice, shirasu basalt, zeolites in expanded forms, and mixtures thereof); and
- about 0%-10% additives (which, in certain embodiments, is selected from the group consisting of viscosity modifiers, fire retardants, waterproofing agents, silica fume, geothermal silica, thickeners, pigments, colorants, plasticizers, dispersants, forming agents, flocculent, drainage aids, wet and dry strength aids, silicone materials, aluminum powder, clay, kaolin, alumina trihydrate, mica, metakaolin, calcium carbonate, wollastonite, polymeric resin emulsion, and mixtures thereof).

FIG. 1 provides a schematic illustration of a process flow 100 of manufacturing a fiber cement composite material of one embodiment of the present invention. As shown in FIG. 1, the process 100 begins with Step 102, which comprises providing bleached and unbleached standard grade cellulose fibers. In one embodiment, the bleached cellulose fibers are less than about 50% of the combined weight of the bleached and unbleached fibers. In another embodiment, Step 102 comprises treating standard grade cellulose fibers with a bleaching agent to form bleached fibers having a Kappa number of less than about 10. The process 100 continues with Step 104, which comprises mixing the bleached and unbleached cellulose fibers with a cementitious binder and other ingredients to form a fiber cement mixture. Subsequently, the fiber cement mixture is formed into a fiber cement article of a pre-selected shape and size in Step 106. The fiber cement article is then cured to form the fiber cement reinforced composite building material in Step 108.

The advantages of incorporating a blend of bleached and unbleached standard grade cellulose fibers in a fiber cement composite matrix are numerous. They include the following:
- resulting composite material achieves a desired balance of strength and flexibility that is normally achievable only through incorporation of premium grade cellulose fibers;
- resulting composite material utilizes bleached cellulose fibers that can be obtained from a variety of commonly available wood species including but not limited to Douglas fir, hemlock, spruce, and redwood;
- bleached fibers require less energy to refine, reducing the product cost of the resulting composite material.

EXAMPLE 1

Table 1 compares the mechanical properties of the fiber-reinforced cement composite materials made with equivalent formulations in which Formulation A incorporates bleached cellulose fibers and Formulation B incorporates premium cellulose fibers. The materials were produced using a Hatschek machine and the results are based on many samples collected over 1 week of production. It can be seen that formulations containing about 13% bleached pulp resulted in products with similar mechanical properties as compared with products based on an equivalent formulation containing about 13% premium fiber of P. Radiata pine.

TABLE 1

| | Property Comparisons | |
|---|---|---|
| | Formulations | |
| Average Physical Properties | A 13% bleached pulp | B 13% premium Radiata pine |
| MOR (MPa) | 10.39 | 10.29 |
| Dry Density (Kg/m$^3$) | 1.25 | 1.25 |
| Strain (μm/m) | 12444 | 11961 |
| Toughness (KJ/m$^3$) | 10.39 | 10.99 |

The base formulation for A and B is: about 35% Portland cement, about 57% ground silica and about 8% cellulose pulp. About 13% of the Formulation A cellulose pulp is bleached pulp and about 13% of the Formulation B cellulose pulp is Radiata pine. The remainder of the pulp for both formulations is standard grade Douglas fir Kraft pulp.

Mechanical properties such as the modulus of rupture (MOR), strain, and toughness, are tested by three-point bending under the wet condition in accordance with ASTM (American Standard Test Method) C1185-98a entitled "Standard Test Methods for Sampling and Testing Non-Asbestos Fiber-Cement Flat Sheet, Roofing and Siding Shingles, and Clapboards."

EXAMPLE 2

Specimens of fiber cement composite materials were made in accordance with Formulations C and D as shown in Table 2 below. Formulation C incorporated a blend of bleached and unbleached cellulose fibers. The fiber blend contained about 20% bleached fibers and about 80% unbleached fibers. Formulation D was the control, which utilized all unbleached fibers. It will be appreciated that the fiber cement formulations were selected for comparison purposes only and that a variety of other formulations can be used without departing from the scope of the present invention.

The oven dry densities of the specimens made in accordance with Formulations C and D were each about 1.25 g/cm$^3$. The bleached fibers were Kraft pulp from Douglas fir with brightness of about 88, a Kappa number of 0 to 1 by TAPPI method T236 and an average fiber length of about 2.4 mm. The unbleached fibers were conventional standard grade cellulose fibers with an average fiber length of about 2.6 mm and a Kappa number of 26. Both the bleached and unbleached fibers were refined to about 450 CSF (Canadian Standard Freeness) measured by TAPPI method T227.

TABLE 2

Formulations for Table 3 Test Results

| Formulation | Hydraulic Binder Portland Cement | Aggregate Silica | Fiber Bleached Fiber | Fiber Unbleached Fiber |
|---|---|---|---|---|
| C | 35% | 57% | 1.6% | 6.4% |
| D | 35% | 57% | 0.0% | 8.0% |

Table 3 below provides an illustrative comparison of various mechanical and physical properties of fiber cement specimens made in accordance with formulations that incorporate a blend of bleached and unbleached cellulose fibers (Formulation C) and those that use conventional, unbleached cellulose fibers (Formulation D). The modulus of rupture (MOR), strain, and toughness are tested by three-point bending under the wet condition in accordance with ASTM (American Standard Test Method) C1185-98a entitled "Standard Test Methods for Sampling and Testing Non-Asbestos Fiber-Cement Flat Sheet, Roofing and Siding Shingles, and Clapboards."

TABLE 3

Property Comparison of Fiber Reinforced Cement Composite Materials With and Without Bleached Cellulose Fibers

| | Formulations | |
|---|---|---|
| Physical Properties | C (with 20% bleached fiber) | D (no bleached fiber) |
| MOR (MPa) | 11.23 | 11.09 |
| Dry Density (Kg/m$^3$) | 1.25 | 1.25 |
| Strain (μm/m) | 13491 | 14292 |
| Toughness (KJ/m$^3$) | 19.26 | 20.62 |

As shown in Table 3, key mechanical properties such as modulus of rupture (MOR) and ultimate strain are generally the same or slightly higher for specimens made with a blend of the bleached and unbleached fibers in accordance with Formulations C when compared to specimens made in accordance with Formulation D, the control formulation without bleached fibers. An equivalent formulation is herein defined as one in which the weight of unbleached cellulose fibers are displaced by an equivalent weight of bleached cellulose fibers. It will be appreciated that these are exemplifying results. By varying the proportional composition of bleached fibers, it will be appreciated that the physical and mechanical properties, such as MOR and strain, etc., of the final products can be changed to meet specific application needs.

Figure 2:
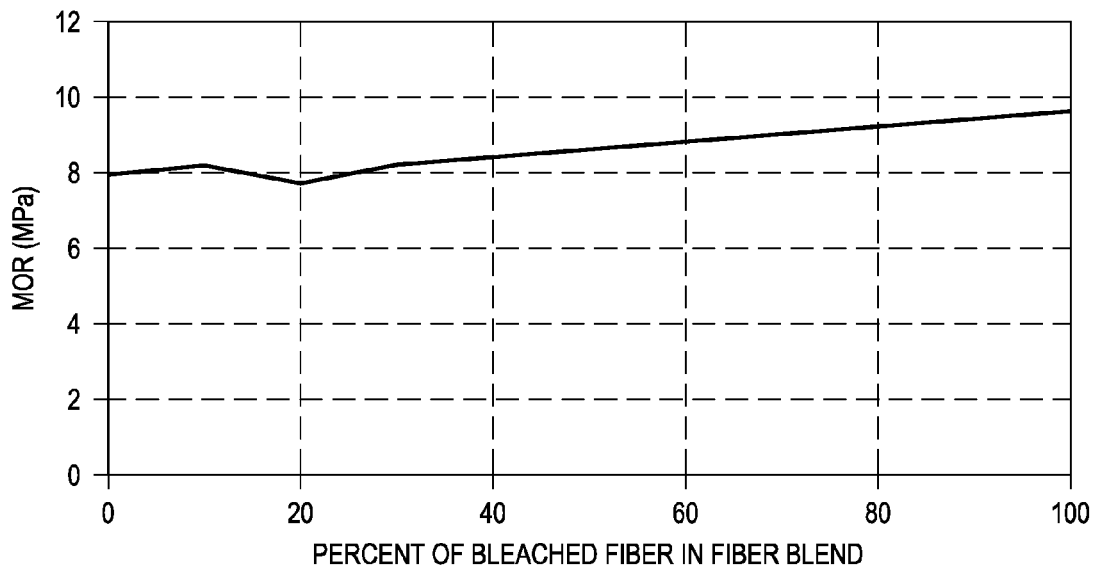
FIG. 2 illustrates the relationship between the modulus of rupture (MOR) of a fiber-cement composite material and varying amounts of bleached fibers incorporated in the material.
Figure 3:
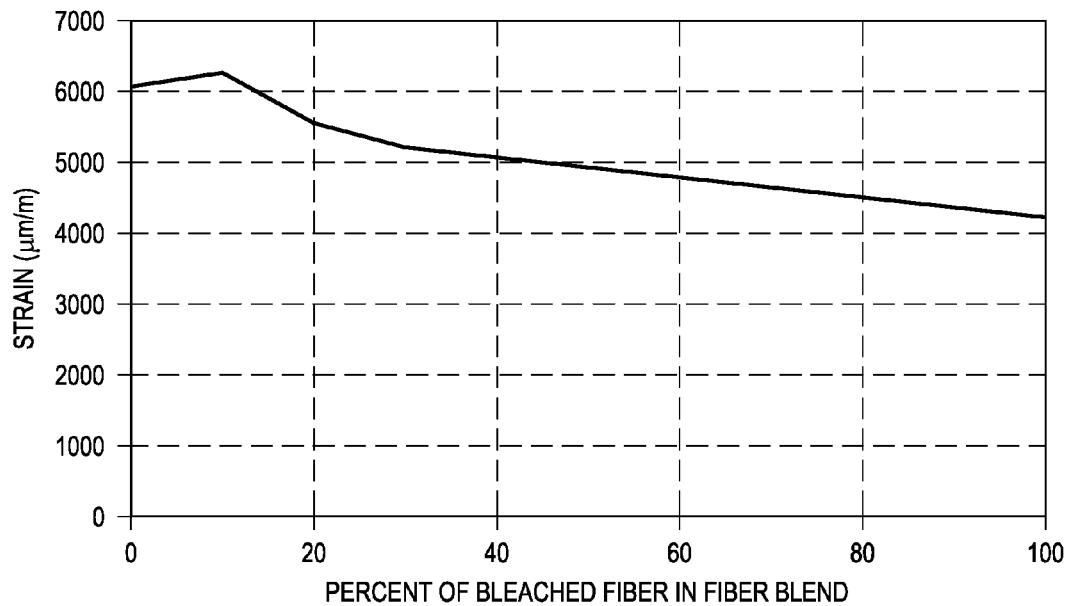
FIG. 3 illustrates the relationship between strain of the fiber-cement composite material and varying amounts of bleached fibers incorporated in the material.
Figure 4:
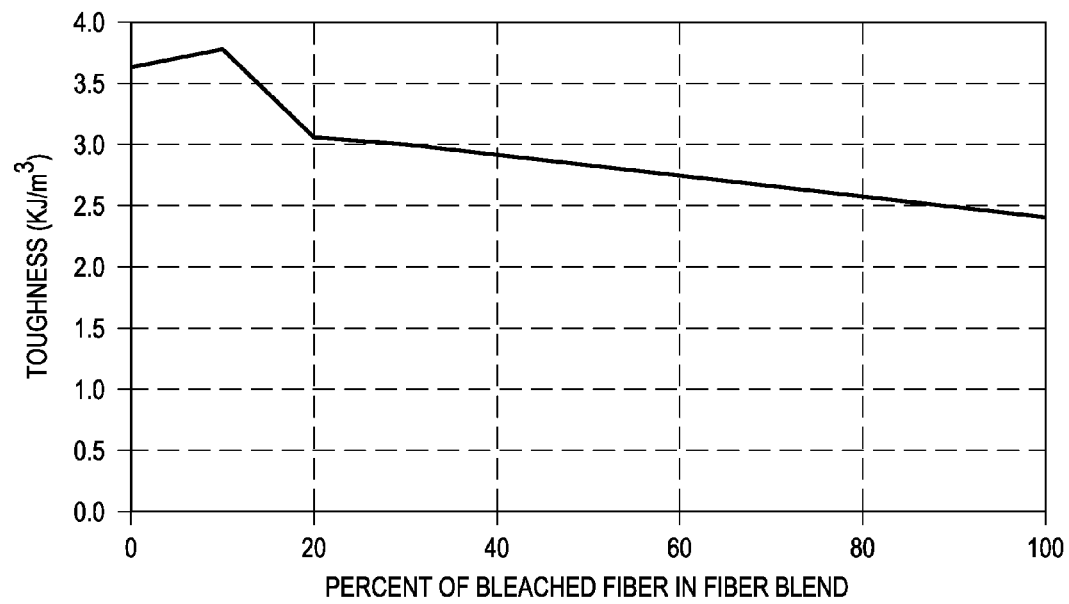
FIG. 4 illustrates the relationship between toughness of the fiber-cement composite material and varying amounts of bleached fibers incorporated in the material.

FIGS. 2 to 4 illustrate the relationship between certain mechanical properties (MOR, strain and toughness) of the fiber-cement products and the percentage of bleached fibers in a fiber blend. It can be seen that percentage of bleached fibers is important for the fiber-cement composite materials to have a balanced properties of MOR, strain and toughness. Excessive bleached fibers present in the blend can adversely affect certain properties. For example, MOR will increase but the strain and toughness will decrease as the percentage of bleached fibers increases. In certain embodiments, to ensure good MOR as well as good strain and toughness, maximum proportions of bleached fibers shall not exceed 40% of the total fibers as shown in FIGS. 2 to 4.

Although the foregoing description of the preferred embodiments of the present invention has shown, described and pointed out the fundamental novel features of the invention, it will be understood that various omissions, substitutions, and changes in the form of the detail of the apparatus as illustrated as well as the uses thereof, may be made by those skilled in the art, without departing from the spirit of the invention. Consequently, the scope of the invention should not be limited to the foregoing discussions, but should be defined by the claims presented in the subsequently filed utility patent application.

What is claimed is:

1. A method of manufacturing a fiber reinforced cement composite material, comprising:
    providing cellulose fibers, wherein the cellulose fibers include bleached cellulose fibers having a Kappa number less than about 10, wherein the bleached cellulose fibers comprise less than about 40 wt. % of total cellulose fibers and are substituted for premium grade cellulose fibers from P. Radiata pine, wherein the bleached cellulose fibers are not from P. Radiata pine having an average tensile strength of more than about 12.5 km by TAPPI method T231;
    mixing the cellulose fibers with a cementitious component to form a fiber cement mixture;
    forming the fiber cement mixture into a shaped fiber cement article; and curing the fiber cement article to form a fiber reinforced cement composite material, wherein, with substitution of the bleached cellulose fibers, modulus of rupture of the fiber reinforced cement composite material when formed is maintained or improved as compared with a fiber reinforced cement composite material manufactured without the substitution for premium grade cellulose fibers.

2. The method of claim 1, wherein providing cellulose fibers includes treating cellulose fibers with a bleaching agent selected from the group consisting of hydrogen peroxide, sodium hypochlorite, and variations thereof.

3. The method of claim 1, wherein the bleached cellulose fibers are from a species selected from the group consisting of Douglas fir, hemlock, spruce, southern yellow pines, kenaf and redwood.

4. The method of claim 2, wherein the cellulose fibers include fibers of P. Radiata pine.

5. The method of claim 1, wherein the cellulose fibers comprises about 0.5 to 20 wt. % of the fiber reinforced cement composite material.

6. The method of claim 1, wherein mixing the cellulose fibers comprises mixing standard grade bleached cellulose fibers to provide the fiber reinforced cement composite material with a comparable or improved toughness as compared with a fiber reinforced cement composite material having only premium grade cellulose fibers.

7. The method of claim 1, wherein the cellulose fibers comprise fibers with An average length between about 1 mm and 3.5 mm.

8. The method of claim 1, wherein the bleached cellulose fibers are initially treated with a bleaching agent to reduce the lignin content of the fibers to a Kappa number of 0 to 1.

9. A formulation for the manufacture of a fiber reinforced cement composite material comprising:
a cementitious component; and
cellulose fibers that include bleached cellulose fibers having a Kappa number of less than about 10,
wherein the bleached cellulose fibers comprise less than about 40 wt.% of total cellulose fibers and are substituted for premium grade cellulose fibers from P. Radiata pine having an average tensile strength of more than about 12.5 km by TAPPI method T231,
wherein substitution with bleached cellulose fibers maintains or improves modulus of rupture of the fiber reinforced cement composite material when manufactured with the substitution as compared with a fiber reinforced cement composite material manufactured without the substitution for premium grade cellulose fibers,
wherein the bleached cellulose fibers are not from P. Radiata pine.

10. The formulation of claim 9, wherein the bleached cellulose fibers comprise about 0.5 to 20 wt. % of the formulation.

11. The formulation of claim 9, wherein the cellulose fibers do not include premium grade cellulose fibers.

12. The formulation of claim 9, wherein the cellulose fibers have an average length between about 1 mm and 3.5 mm.

13. The formulation of claim 9, wherein none of the cellulose fibers are from P. Radiata pine.

14. The formulation of claim 9, wherein the bleached cellulose fibers are treated with a bleaching agent to reduce the lignin content of the fibers to a Kappa number less than about 10.

15. The formulation of claim 9, wherein the bleached cellulose fibers are from a species selected from the group consisting of Douglas fir, hemlock, spruce, southern yellow pines, kenaf and redwood.

16. A method of manufacturing a fiber reinforced cement composite material, comprising:
providing cellulose fibers, wherein the cellulose fibers are refined and comprise a blend of fibers that include bleached fibers having a Kappa number less than about 10, wherein the bleached cellulose fibers comprise less than about 40 wt. % of total cellulose fibers and are substituted for premium grade cellulose fibers from P. Radiata pine having an average tensile strength of more than about 12.5 km by TAPPI method T231, wherein the bleached cellulose fibers are not from P. Radiata pine;
mixing the cellulose fibers with a cementitious component to form a fiber cement mixture;
forming the fiber cement mixture into a fiber cement article; and
curing the fiber cement article to form a fiber reinforced cement composite material,
wherein with substitution of the bleached cellulose fibers modulus of rupture of the fiber reinforced cement composite material when formed is maintained or improved as compared with a fiber reinforced cement composite material manufactured without substitution for premium grade cellulose fibers.

17. The method of claim 16, wherein the bleached cellulose fibers are from a species selected from the group consisting of Douglas fir, hemlock, spruce, southern yellow pines, kenaf and redwood with a Kappa number of 0 to 1.

18. The method of claim 16, wherein the cellulose fibers comprise fibers with an average length between about 1 mm and 3.5 mm.

19. The method of claim 16, wherein mixing the cellulose fibers provides the composite material with improved toughness as compared with a fiber reinforced cement composite material having only premium grade cellulose fibers.

20. The method of claim 16, wherein the cellulose fibers comprise about 0.5 to 20% by weight of the fiber reinforced cement composite material.

* * * * *